(12) United States Patent
Athanassiadis

(10) Patent No.: US 7,305,588 B2
(45) Date of Patent: *Dec. 4, 2007

(54) TESTING THE INTERRUPT SOURCES OF A MICROPROCESSOR

(76) Inventor: Harry Athanassiadis, 51 Chopin Road, Basingstoke, RG22 4JN (GB)

(*) Notice: Subject to any disclaimer, the term of this patent is extended or adjusted under 35 U.S.C. 154(b) by 612 days.

This patent is subject to a terminal disclaimer.

(21) Appl. No.: 10/293,902

(22) Filed: Nov. 12, 2002

(65) Prior Publication Data

US 2003/0120976 A1 Jun. 26, 2003

(30) Foreign Application Priority Data

Nov. 12, 2001 (GB) .................... 0127142.8

(51) Int. Cl.
*G06F 11/00* (2006.01)
*G06F 5/00* (2006.01)
*G06F 13/00* (2006.01)
*G06F 13/24* (2006.01)

(52) U.S. Cl. .................. 714/34; 710/104; 710/48; 710/260

(58) Field of Classification Search ........ 710/260, 710/261, 48, 104; 714/34
See application file for complete search history.

(56) References Cited

U.S. PATENT DOCUMENTS

| | | | |
|---|---|---|---|
| 3,735,357 A * | 5/1973 | Maholick et al. ........... 710/40 |
| 4,470,111 A * | 9/1984 | Jenkins et al. ............. 710/41 |
| 4,734,882 A * | 3/1988 | Romagosa ................. 710/264 |
| 5,603,035 A * | 2/1997 | Erramoun et al. .......... 710/260 |
| 5,822,595 A | 10/1998 | Hu |
| 5,894,578 A * | 4/1999 | Qureshi et al. ............ 710/266 |
| 6,081,867 A * | 6/2000 | Cox ........................ 710/264 |
| 6,098,144 A | 8/2000 | De Oliveira et al. |
| 6,167,479 A * | 12/2000 | Hartnett et al. ........... 710/260 |
| 6,269,419 B1 * | 7/2001 | Matsuyama ................ 710/269 |
| 6,499,078 B1 * | 12/2002 | Beckert et al. ............ 710/260 |
| 6,581,119 B1 * | 6/2003 | Maeda et al. .............. 710/260 |
| 6,618,780 B1 | 9/2003 | Popat |
| 6,813,666 B2 | 11/2004 | Joffrain |

(Continued)

Primary Examiner—Mark H. Rinehart
Assistant Examiner—Christopher Daley
(74) Attorney, Agent, or Firm—Klarquist Sparkman LLP

(57) ABSTRACT

A method of testing the interrupt sources of a microprocessor having a number of interrupts which are each operable to execute an interrupt service routine when enabled, each interrupt having a default priority level and an associated memory, the interrupts having a service order in which they are to be serviced, the method comprising the steps of: a) sorting the interrupts in descending service order; b) determining an array of priority levels to be assigned in a pre-arranged sequence to selections of interrupts in descending service order, the array of priority levels consisting of: the lowest priority level; and the priority levels in descending order from the highest priority level to the lowest priority level; c) incrementing a global counter; d) assigning the array of priority levels to a selected group of interrupts, the remainder of the interrupts assuming their pre-assigned priority level; e) enabling all interrupts simultaneously so that the interrupt having the highest priority level executes its interrupt service routine; f) transferring the value of the global counter into the memory of the interrupt having executed its interrupt service routine; g) repeating steps c) to f) until the pre-arranged sequence is completed; and h) comparing the interrupt memory values after completion of the pre-arranged sequence with expected values and determining from the comparison whether there is an error in the microprocessor interrupts.

11 Claims, 2 Drawing Sheets

| ie13 | ie12 | ie11 | ie10 | ie9 | ie8 | ie7 | ie6 | ie5 | ser | tf1 | ie1 | tf0 | ie0 |

| 0 | 3 | 2 | 1 | 0 | →

Priority window

U.S. PATENT DOCUMENTS 6,820,155 B1 11/2004 Ito
6,920,630 B2* 7/2005 Jackson ..................... 717/168
6,993,685 B2* 1/2006 Ramaswamy et al. ........ 714/43
2002/0112107 A1 8/2002 Joffrain

* cited by examiner

| ie13 | ie12 | ie11 | ie10 | ie9 | ie8 | ie7 | ie6 | ie5 | ser | tf1 | ie1 | tf0 | ie0 | STEP 10 |
|------|------|------|------|-----|-----|-----|-----|-----|-----|-----|-----|-----|-----|---------|
|      |      |      |      |     |     |     |     |     | 0   | 3   | 2   | 1   | 0   |         |

| ie13 | ie12 | ie11 | ie10 | ie9 | ie8 | ie7 | ie6 | ie5 | ser | tf1 | ie1 | tf0 | ie0 | STEP 11 |
|------|------|------|------|-----|-----|-----|-----|-----|-----|-----|-----|-----|-----|---------|
|      |      |      |      |     |     |     |     |     | 0   | 3   | 2   | 1   | 0   |         |

| ie13 | ie12 | ie11 | ie10 | ie9 | ie8 | ie7 | ie6 | ie5 | ser | tf1 | ie1 | tf0 | ie0 | STEP 12 |
|------|------|------|------|-----|-----|-----|-----|-----|-----|-----|-----|-----|-----|---------|
|      |      |      |      |     |     |     |     |     |     | 0   | 3   | 2   | 1   |         |

| ie13 | ie12 | ie11 | ie10 | ie9 | ie8 | ie7 | ie6 | ie5 | ser | tf1 | ie1 | tf0 | ie0 | STEP 13 |
|------|------|------|------|-----|-----|-----|-----|-----|-----|-----|-----|-----|-----|---------|
|      |      |      |      |     |     |     |     |     |     |     | 0   | 3   | 2   |         |

| ie13 | ie12 | ie11 | ie10 | ie9 | ie8 | ie7 | ie6 | ie5 | ser | tf1 | ie1 | tf0 | ie0 | STEP 14 |
|------|------|------|------|-----|-----|-----|-----|-----|-----|-----|-----|-----|-----|---------|
|      |      |      |      |     |     |     |     |     |     |     |     | 0   | 3   |         |

| ie13 | ie12 | ie11 | ie10 | ie9 | ie8 | ie7 | ie6 | ie5 | ser | tf1 | ie1 | tf0 | ie0 | STEP 15 |
|------|------|------|------|-----|-----|-----|-----|-----|-----|-----|-----|-----|-----|---------|
|      |      |      |      |     |     |     |     |     |     |     |     |     | 0   |         |

| ie13 | ie12 | ie11 | ie10 | ie9 | ie8 | ie7 | ie6 | ie5 | ser | tf1 | ie1 | tf0 | ie0 | STEP 16 |
|------|------|------|------|-----|-----|-----|-----|-----|-----|-----|-----|-----|-----|---------|

FIG 2b

TESTING THE INTERRUPT SOURCES OF A MICROPROCESSOR

CROSS REFERENCE TO RELATED APPLICATION

This application claims priority from U.K. Patent Application No. 0127142.8, filed Nov. 12, 2001.

FIELD OF THE INVENTION

This invention relates to a method of testing the servicing of interrupt sources of a microprocessor and more particularly to a method of testing the servicing of interrupt sources in a microprocessor having interrupts with one or more priority levels.

BACKGROUND

An interrupt is a break in the normal flow of instruction processing in a central processing unit triggered by a hardware signal from an external or internal source. Typically, a microprocessor will have a plurality of interrupt sources each of which can be enabled or triggered to execute an interrupt service routine. Each of the interrupts of the microprocessor has an assignable priority level which is typically set by default.

When two interrupts are enabled, the interrupt with the highest priority level initiates its interrupt service routine. The interrupts also have a service order so that if two interrupts having the same highest priority level are enabled, the interrupt being first in the service order initiates its interrupt service routine.

For a microprocessor having fourteen interrupts, each interrupt having four priority levels (3, 2, 1, 0) there are $4^{14}$, i.e. 268,435,456 interrupt/priority level permutations and it would normally be necessary to test each of these permutations to determine whether or not all the interrupts on the microprocessor correctly function at their respective possible priority levels. The testing time required to test all permutations is unacceptable and this burden of testing would delay time to market.

Accordingly, it is an object of the present invention to seek to provide a method of testing interrupt sources in a microprocessor having interrupts with a plurality of priority levels which reduces the test burden.

Accordingly, one aspect of the present invention provides a method of testing the interrupt sources of a microprocessor having a number of interrupts which are each operable to execute an interrupt service routine when enabled, each interrupt having a default priority level and an associated memory, the interrupts having a service order in which they are to be serviced, the method comprising the steps of: a) sorting the interrupts in descending service order; b) determining an array of priority levels to be assigned in a pre-arranged sequence to selections of interrupts in descending service order, the array of priority levels consisting of: the lowest priority level; and the priority levels in descending order from the highest priority level to the lowest priority level; c) incrementing a global counter; d) assigning the array of priority levels to a selected group of interrupts, the remainder of the interrupts assuming their pre-assigned priority level; e) enabling all interrupts simultaneously so that the interrupt having the highest priority level executes its interrupt service routine; f) transferring the value of the global counter into the memory of the interrupt having executed its interrupt service routine; g) repeating steps c) to f) until the pre-arranged sequence is completed; and h) comparing the interrupt memory values after completion of the pre-arranged sequence with expected values and determining from the comparison whether there is an error in the microprocessor interrupts.

Preferably, the array of priority levels is assigned to a first group of interrupts and then subsequently to other groups of interrupts in descending service order.

Conveniently, the first assignment of the array of priority levels to a selected group of interrupts comprises assigning the highest priority level in the array to the interrupt being last in the service order, the first priority level in the array being the lowest priority level not being assigned to an interrupt and the remainder of the priority levels in the array being assigned to the remainder of the interrupts in the selected group of interrupts in descending service order.

Advantageously, the first repetition of step (d) assigns the first priority level of the array, the lowest priority level, to the interrupt being last in the service order, the remainder of the priority levels in the array being assigned to the remainder of the interrupts in the selected group of interrupts.

Preferably, subsequent repetitions of step (d) assign the first of the priority levels of the array to the next interrupt in descending service order until the first priority level of the array has been assigned to every interrupt, and the final repetition assigns the default priority levels to the interrupts, thereby marking the end of the pre-arranged sequence.

Conveniently, there are four priority levels: 3; 2; 1; and 0, 3 being the highest priority level and 0 being the lowest priority level, the array of priority levels therefore comprising: 0;3:2;1;0.

Advantageously, the global counter has an initial value of 0 and step c) of incrementing the global counter comprises the step of incrementing the global counter by one.

Preferably, the number of repetitions of steps c) to f) is greater than the number of interrupts.

Conveniently, the microprocessor has 14 interrupts with 4 priority levels, 16 repetitions of steps c) to f) being required to complete the sequence.

Advantageously, the pre-arranged sequence requires at least the highest priority level in the array to be assigned to each of the interrupts in descending service order.

In order that the present invention may be more readily understood, embodiments thereof will now be described, by way of example, with reference to the accompanying drawings.

BRIEF DESCRIPTION OF THE DRAWINGS

FIGS. 2a and 2b schematically shows sixteen steps in a test methodology embodying the present invention.

DETAILED DESCRIPTION

Figure 1:
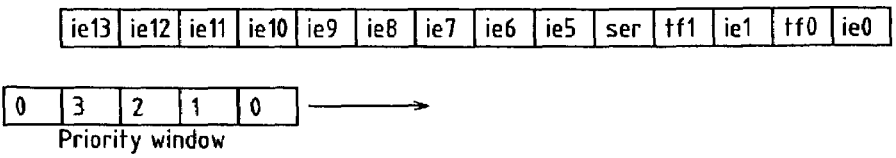
FIG. 1 is a schematic representation of the interrupts of a microprocessor and a priority window for use with the method embodying the present invention.

Referring to FIG. 1, the interrupt sources of a microprocessor are shown schematically. The microprocessor has a plurality of interrupt sources, each of which can be enabled to cause an interrupt service routine to be executed. Only the interrupt sources of the microprocessor are shown. In this example, there are fourteen interrupt sources labelled, ie13, ie12, ie11, ie10, ie9, ie8, ie7, ie6, ie5, ser, tf1, ie1, tf0, ie0.

Each of the interrupts can be assigned with a priority level. In this example, the highest priority level is 3 and the lowest priority level is 0. The interrupts also have a service order, i.e. an order in which the interrupts will be serviced in the event that there is more than one interrupt with a highest priority level. This configuration is shown below in the Table.

and then the full range of priority levels in descending order from the highest priority level 3 to the lowest priority level 0, i.e. the array comprises the priority levels: 0; 3; 2; 1; and 0.

TABLE

| Interrupts: | ie13 | ie12 | ie11 | ie10 | ie9 | ie8 | ie7 | ie6 | ie5 | ser | tf1 | ie1 | tf0 | ie0 |
|---|---|---|---|---|---|---|---|---|---|---|---|---|---|---|
| Default Priority level: | 0 | 0 | 0 | 0 | 0 | 0 | 0 | 0 | 0 | 0 | 0 | 0 | 0 | 0 |
| Service Order | 14 | 13 | 12 | 11 | 10 | 9 | 8 | 7 | 6 | 5 | 4 | 3 | 2 | 1 |

The priority levels assigned to the respective interrupts in combination with the service order determine the order in which the interrupt service routines for the respective interrupts would be executed upon enablement of one or more of the interrupts. Thus, in normal operation of the microprocessor, if two interrupts are triggered, one having a higher priority level than the other, then the interrupt with the highest priority level will execute its associated interrupt service routine.

It should be noted that the interrupts are arranged schematically in FIG. 1, in order of descending service order, the interrupts on the right-hand side being first in the service order. In the present example, all the interrupts have the same default priority level of zero.

The present invention introduces the concept of a priority window. A priority window is a set or array of assignable priority levels covering the respective priority levels which can be attributed to the interrupts and which can be assigned to a group of interrupts. In the present example, the priority window comprises an array of five priority levels: 0; 3; 2; 1; and 0.

In accordance with a test methodology embodying the present invention, the priority levels specified in the priority window are applied in a pre-determined sequence to the interrupts of the microprocessor so as to override the default priority levels which the interrupts would otherwise adopt. The priority window is applied to the interrupts at a series of predetermined locations and in a predetermined order.

Each of the interrupts has an associated memory or flag. A global counter is also provided and is operable to transfer its value at a given time to one of the interrupt flags.

Figure 2A:
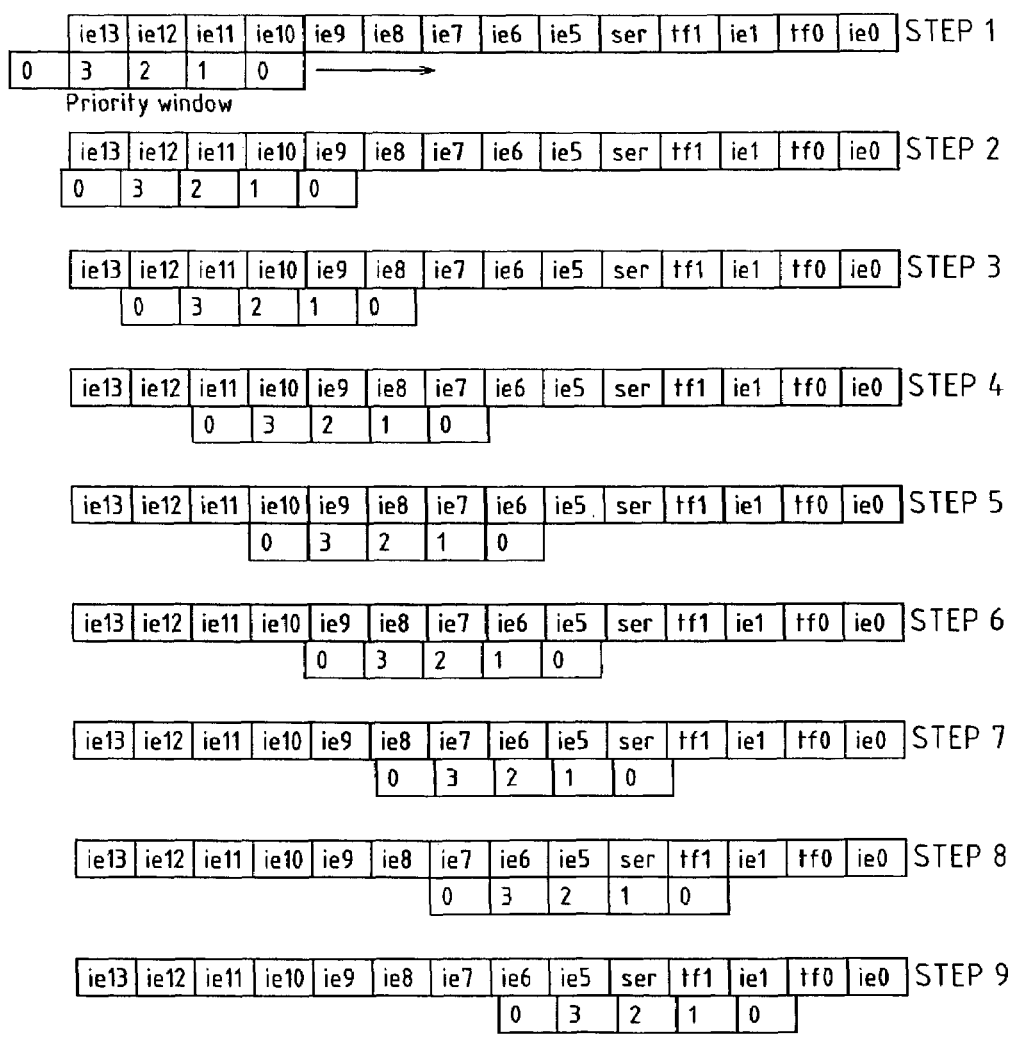

A test methodology embodying the present invention operates in the following manner as illustrated in FIG. 2 which shows 16 steps in the test methodology.

In the first step, the interrupt sources are shown in descending service order, the source which is first, ie0, in the service order being on the far right hand-side and the source which is last (fourteenth) in the service order, being the left most interrupt source, ie13. A priority window embodying the present invention is also shown in step 1 of FIG. 2. As described earlier, in this example, there are 4 priority levels assignable to any one of the interrupt sources, 3 being the highest priority level and the 0 being the lowest. The priority window, or array of priority levels, comprises 5 discrete priority levels which are respectively intended to be assigned to selected ones of a group of interrupt sources. The array of priority levels comprises the lowest priority level 0, Step 1 of FIG. 2 schematically shows the priority window being applied to the interrupt sources. In this regard, the test methodology is, of course, configured as a software routine but this is best illustrated graphically in the sequential steps shown in FIG. 2.

The priority window or array of priority levels is applied to a selected group of interrupt sources—in the first instance, the highest priority level in the array is applied to the interrupt source having the lowest service order, the next priority level in the array is provided to the next interrupt source in descending service order and so on. Thus, the priority levels assigned to the interrupt sources are altered from their default values (0) for those interrupt sources to which the priority window is applied.

Once the priority levels have been assigned to this selected group of interrupts (and the remainder of the interrupts maintain their default priority levels), then all the interrupts are enabled simultaneously. The interrupt source having the highest priority level is the only interrupt source which executes its interrupt service routine. Upon execution of its interrupt service routine, the interrupt flag for the interrupt executing its interrupt service routine is written with the value of the global counter.

The global counter has an initial value of 0 which is incremented by 1 before the interrupts are enabled. Thus, for the first step shown in FIG. 2, the value of 1 from the global counter is transferred into the interrupt flag for interrupt ie13 since this has the highest priority level as assigned by the array of priority levels.

The above-mentioned steps comprise the steps of a first loop which is then repeated following re-assignment of the priority levels. Priority levels are reassigned by moving the array of priority levels along one, so that the highest priority level in the array is now applied to the next interrupt in descending service order which is interrupt ie12.

It should be noted that in the first step, the first priority level 0 in the array of priority level is not assigned to an interrupt whereas in the second step, the first priority level in the array is now assigned to the interrupt ie13 which is last in the service order.

The array of priority levels are again assigned to the selected group of interrupts, the remainder of the interrupts assuming their default priority level. Again, all the interrupts are enabled simultaneously, but only one of the interrupts having the highest priority level executes its interrupt service routine. In the second step, this is interrupt ie12, the second to last interrupt in the descending service order.

The sequence of steps applying the array of priority levels to selected groups of the interrupts in descending service order continue until the first priority level of the array has been assigned to every interrupt. A final loop assigns the default priority levels to the interrupts (step 16) to mark the end of the pre-arranged sequence.

Throughout these loops, the value of the global counter is transferred into the memory of the interrupt which executes its interrupt service routine at each of the steps. Thus, as the priority window "slides" down the interrupt sources in descending service order, the respective interrupt flags provide a map in the form of the global counter counts stored therein of the performance of the microcontroller interrupts. At the end of the pre-arranged sequence shown in FIG. 2, the interrupt flags of the respective interrupts hold the following values:

| Interrupt | Interrupt Flag Value |
| --- | --- |
| ie13 | 1 |
| ie12 | 2 |
| ie11 | 3 |
| ie10 | 4 |
| ie9 | 5 |
| ie8 | 6 |
| ie7 | 7 |
| ie6 | 8 |
| ie5 | 9 |
| ser | 10 |
| tf1 | 11 |
| ie1 | 12 |
| tf0 | 13 |
| ie0 | 16 |

The interrupt flag values shown above follow a logical progression from the interrupt source which is last in the service order (ie13) to the interrupt source which is second in the service order (tf0). It will be noted that the interrupt source which is first in the service order, ie0, has an interrupt flag value of 16. The value of 16 in this last interrupt flag is obtained as follows:

In step 14 of FIG. 2, the last interrupt source, ie0 is assigned the highest priority level 3 and therefore executes its interrupt service routine and the interrupt flag for this source is updated with the global counter value, 14. In the subsequent step 15, only the first of the priority levels in the array is assigned to interrupt ie0, all the other interrupt sources taking on their default value of 0. Since interrupt source ie0 is the first in the service order, it is again the interrupt which executes its interrupt service routine thus transferring the global counter value of 15 into the interrupt flag overwriting the previous value of 14. In the last step, step 16, in which all the interrupt sources take on their default value, 0, the interrupt source ie0 is first in the service order and is therefore again the source which executes its interrupt service routine, leading to the value in the global counter, 16, to be transferred into the interrupt flag for interrupt ie0 overwriting the previous value of 15. Thus, as the end of the test, the value 16 is stored in the interrupt flag for interrupt ie0 as shown in the above values.

The table above represents a map for a microprocessor in which the interrupt controls are working correctly. Thus, microprocessors can be tested using the above-mentioned methodology and a map or signature for that microcontroller will be produced, comprised of the values of the respective interrupt flags. That map can then be compared with a map of expected values (equivalent to that shown above) or produced from another correctly functioning microprocessor and, if there is any deviation from the expected values, then this is an indication that there is an error in the microprocessor interrupt controls. The microprocessor is failed and either discarded or subjected to debugging.

It will be appreciated that the example of the 14 interrupt source microprocessor disclosed above requires only 16 steps to construct the interrupt flag map thereby significantly improving on the test methodology by reducing the number of test cycles which are necessary to test the interrupts at their respective possible priority levels. The above-mentioned test provides a high confidence level for the correct functionality of the interrupt controls and therefore a viable test methodology.

What is claimed is:

1. A method of testing the servicing of interrupt sources of a microprocessor having a number of interrupt sources which are each operable to execute an interrupt service routine when enabled, each interrupt having a default priority level and an associated memory, each interrupt source having a position in a service order in which they are to be serviced, the method comprising the steps of:
   a) sorting the interrupts in descending service order;
   b) determining an array of priority levels to be assigned in a pre-arranged sequence to selections of interrupts in descending service order, the array of priority levels consisting of: the lowest priority level; and the priority levels in descending order from the highest priority level to the lowest priority level;
   c) incrementing a global counter;
   d) assigning the array of priority levels to a selected group of interrupts, the remainder of the interrupts assuming their default priority level;
   e) enabling all interrupts simultaneously so that the interrupt having the highest priority level executes its interrupt service routine unless two or more of the interrupts each have the same highest priority level, in which event the interrupt having a highest service order executes its interrupt service routine;
   f) transferring the value of the global counter into the memory of the interrupt having executed its interrupt service routine;
   g) repeating steps c) to f) to the next selected group of interrupts until the pre-arranged sequence is completed; and
   h) comparing the interrupt memory values after completion of the pre-arranged sequence with expected values and determining from the comparison whether there is an error in the microprocessor interrupts.

2. A method according to claim 1, wherein the array of priority levels is assigned to a first group of interrupts and then subsequently to other groups of interrupts in descending service order.

3. A method according to claim 2, wherein the first assignment of the array of priority levels to a selected group of interrupts comprises assigning the highest priority level in the array to the interrupt being last in the service order, a first priority level in the array being the lowest priority level not being assigned to an interrupt and the remainder of the priority levels in the array being assigned to the remainder of the interrupts in the selected group of interrupts in descending service order.

4. A method according to claim 3, wherein the first repetition of step d) assigns the first priority level of the array, the lowest priority level, to the interrupt being last in the service order, the remainder of the priority levels in the array being assigned to the remainder of the interrupts in the selected group of interrupts.

5. A method according to claim 4, wherein subsequent repetitions of step d) assign the first of the priority levels of the array to the next interrupt in descending service order until the first priority level of the array has been assigned to every interrupt, and the final repetition assigns the default priority levels to the interrupts, thereby marking the end of the pre-arranged sequence.

6. A method according to claim 1, wherein there are four priority levels: 3; 2; 1; and 0, 3 being the highest priority level and 0 being the lowest priority level, the array of priority levels therefore comprising: 0;3:2;1;0.

7. A method according to claim 1, wherein the global counter has an initial value of 0 and step c) of incrementing the global counter comprises the step of incrementing the global counter by one.

8. A method according to claim 1, wherein the number of repetitions of steps c) to f) is greater than the number of interrupts.

9. A method according to claim 1, wherein the microprocessor has 14 interrupts with 4 priority levels, 16 repetitions of steps c) to f) being required to complete the sequence.

10. A method according to claim 1, wherein the pre-arranged sequence requires at least the highest priority level in the array to be assigned to each of the interrupts in descending service order.

11. A method of testing the servicing of interrupt sources of a microprocessor having a number of interrupt sources, each interrupt source having a default priority and an associated memory, the interrupt sources having a service order, the method comprising the steps of:

a) sorting the interrupts into a predetermined order;

b) determining an array of priority levels to be assigned in a pre-arranged sequence to selections of interrupts;

c) incrementing a global counter;

d) assigning the array of priority levels to a selected group of interrupts, the non-selected interrupts maintaining the default priority levels;

e) enabling all interrupts simultaneously whereby the interrupt having the highest priority level executes an associated service routine unless two or more of the interrupts each have the same highest priority level, in which event an interrupt having a highest service order executes an associated service routine;

f) transferring the contents of the global counter into the associated memory of the interrupt having executed its associated service routine after all interrupts were enabled;

g) repeating steps c) and f) to the next selected group of interrupts until the pre-arranged sequence is completed; and h) comparing the interrupt memory values, after enabling all interrupts with expected values and determining errors.

* * * * *

UNITED STATES PATENT AND TRADEMARK OFFICE
CERTIFICATE OF CORRECTION

PATENT NO. : 7,305,588 B2  Page 1 of 1
APPLICATION NO. : 10/293902
DATED : December 4, 2007
INVENTOR(S) : Harry Athanassiadis It is certified that error appears in the above-identified patent and that said Letters Patent is hereby corrected as shown below:

In the Specification:

Column 5, line 46, "all the other interrupt" should read -- with all the other interrupt --.

Column 5, line 57, "Thus, as" should read -- Thus, at --.

In the Claims:

Column 7, line 11, "comprising 0;3:2;1;0." should read -- comprising: 0;3;2;1;0. --.

Signed and Sealed this

Twenty-seventh Day of July, 2010

David J. Kappos
*Director of the United States Patent and Trademark Office*